Sept. 5, 1939.  J. C. KARNES  2,171,571
ILLUMINATED RETICLE
Filed Oct. 6, 1937
Fig-1-
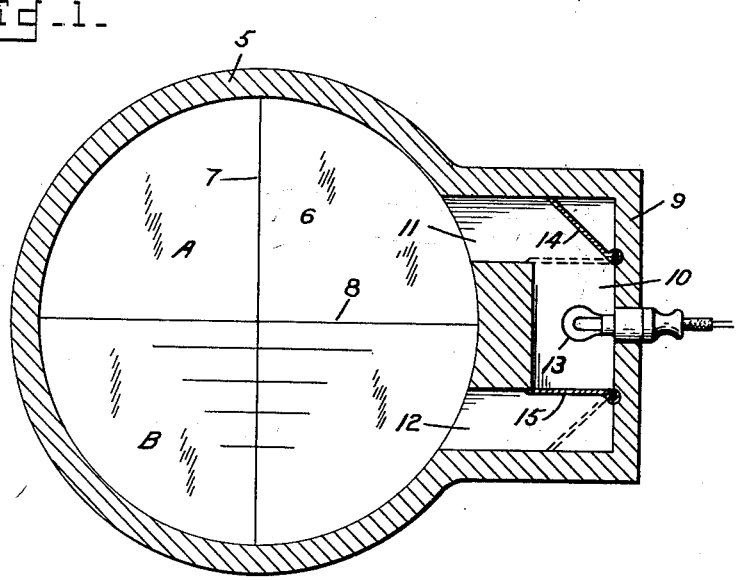
Fig-2-
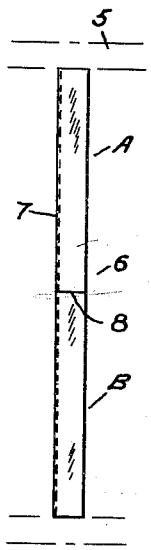
Inventor
James C. Karnes
By W. N. Roach
Attorney Patented Sept. 5, 1939

2,171,571

UNITED STATES PATENT OFFICE 2,171,571

ILLUMINATED RETICLE

James C. Karnes, Buffalo, N. Y.

Application October 6, 1937, Serial No. 167,604

3 Claims. (Cl. 88—1)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an illuminated reticle for optical instruments.

In optical instruments including a reticle for establishing a line of sight or conveniently measuring small angles, the lines of the reticle are usually cut or etched in glass and appear black or dark on a light background. In employing an instrument for viewing a distant object the nature of the landscape and the particular conditions of light and shadow frequently produce a situation where the black lines of the reticle are not visible with sufficient distinctness and clarity. When the object to be viewed is in the vicinity of the horizon it may be desirable to have the lower portion of the reticle appear white and the upper portion appear black.

The purpose of the invention is to provide an optical instrument in which the upper and lower portions of the reticle may be selectively illuminated.

To these and other ends, the invention consists in the construction, arrangement and combination of elements described hereinafter and pointed out in the claims forming a part of this specification.

A practical embodiment of the invention is illustrated in the accompanying drawing, wherein:

Fig. 1 is a transverse sectional view of an optical instrument constructed in accordance with the invention.

Fig. 2 is a view in side elevation of a glass plate on which the reticle is formed.

Referring to the drawing by characters of reference, there is shown an optical instrument comprising a tubular casing 5 whose main chamber is adapted to contain the optical elements of the instrument and a plate of plane parallel glass 6 provided with a reticle 7. The plate 6 consists of two semi-circular plate elements A and B, the flat edges abutting, and both coated with a material which reflects light so that light cannot pass from one to the other. The elements are so arranged that their abutting edges establish the horizontal line 8 of the reticle.

The casing 5 is formed with a lateral projection 9 which provides an auxiliary chamber 10 that is in communication with the main chamber of the casing 5 through a pair of spaced passages 11 and 12 formed in the wall of the casing and leading respectively to the periphery of the portions A and B of the glass plate 6.

A source of illumination, conveniently an incandescent lamp 13, is disposed in the chamber 10.

A pair of shutters 14 and 15 are provided for respectively interrupting communication between the chamber 10 and the passages 11 and 12. For example when the shutter 14 is closed and the shutter 15 open the reticle lines in the plate element B will appear white on a darker background, the lines in portion A will be black on a light background while the lower half of the line 8 will be white and the upper half will be black. The plate elements A and B may be illuminated separately or together to suit the particular conditions of visibility.

I claim:

1. A sighting instrument comprising a casing having a main chamber and an auxiliary chamber and spaced passages connecting the chambers, a source of illumination in the auxiliary chamber, shutters mounted in the casing for establishing and interrupting light transmission between the auxiliary chamber and the passages, a glass plate within the main chamber and comprising two plate elements having abutting edge portions, the meeting edges of said abutting portions being light-reflecting and establishing a reticle line normally appearing black, the two plate elements each having its periphery in line with one of the passages whereby light rays from the source of illumination are directed into said elements to cause the reticle lines to appear white.

2. In a sighting instrument, a tube having openings, a glass plate within the tube and comprising two plate elements having abutting edge portions, the meeting edges of said abutting portions being light-reflecting and establishing a reticle line normally appearing black, each plate element having additional reticle lines normally appearing black, and means for selectively directing light rays through the openings in the tubes and into the peripheral portions of the plate elements to cause the reticle lines to appear white.

3. In a sighting instrument, a tube having openings, a glass plate within the tube and comprising two plate elements having abutting edge portions, the meeting edges of said abutting portions being light reflecting and establishing a reticle line normally appearing black, and means for selectively directing light rays through the openings in the tubes and into the peripheral portions of the plate elements to cause the reticle line to appear white.

JAMES C. KARNES.